May 25, 1954
C. F. MADDUX
2,679,301
MACHINE FOR LUBRICATING ANTIFRICTION BEARINGS
Filed Aug. 17, 1949
3 Sheets-Sheet 1
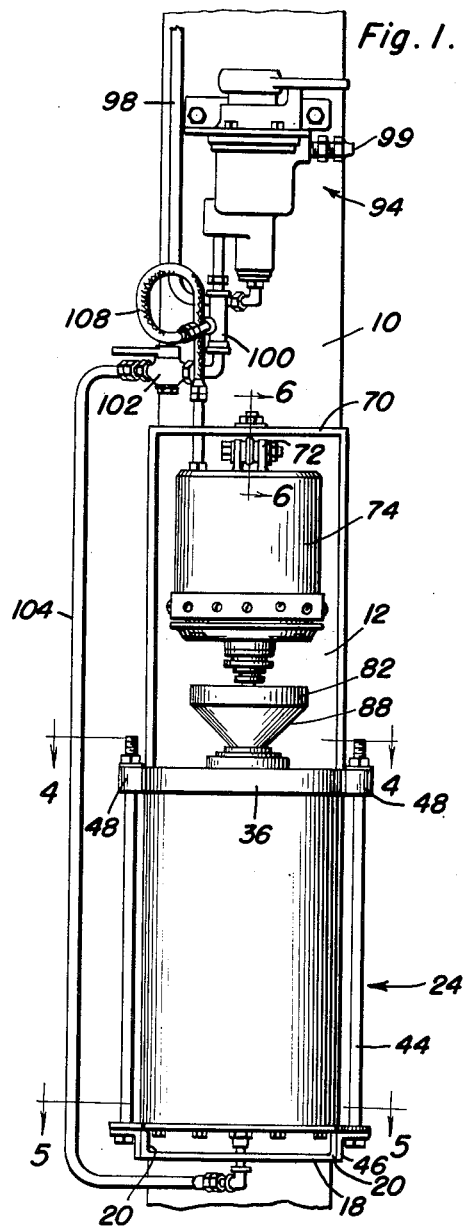
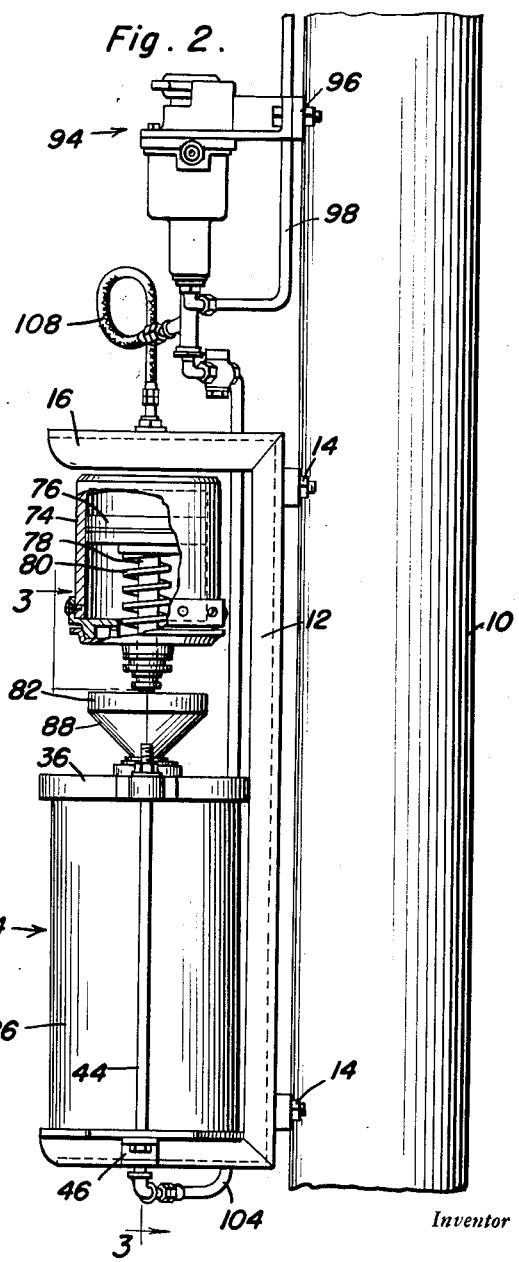
Inventor
Cortez F. Maddux
By Clarence A. O'Brien
and Harvey B. Jacobson
Attorneys Inventor
Cortez F. Maddux May 25, 1954
C. F. MADDUX
2,679,301
MACHINE FOR LUBRICATING ANTIFRICTION BEARINGS
Filed Aug. 17, 1949
3 Sheets-Sheet 3
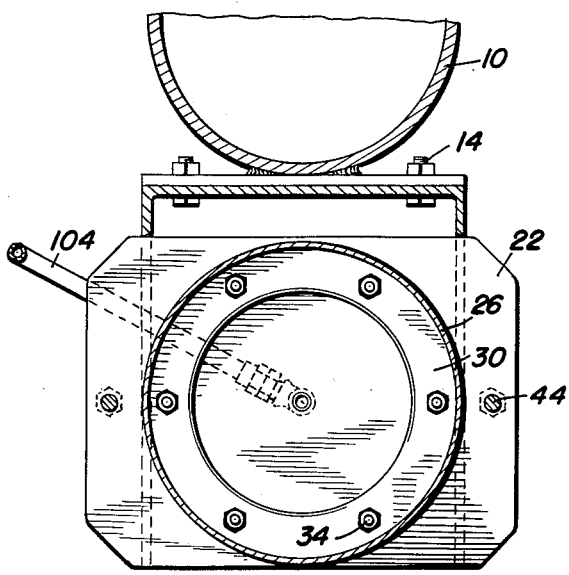
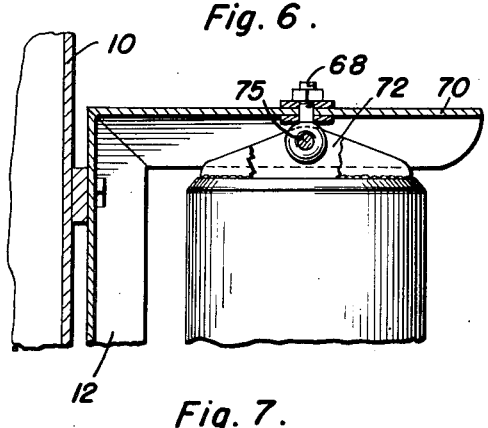
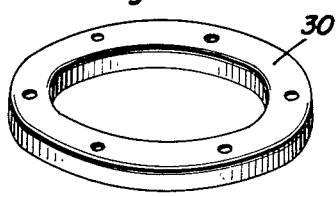
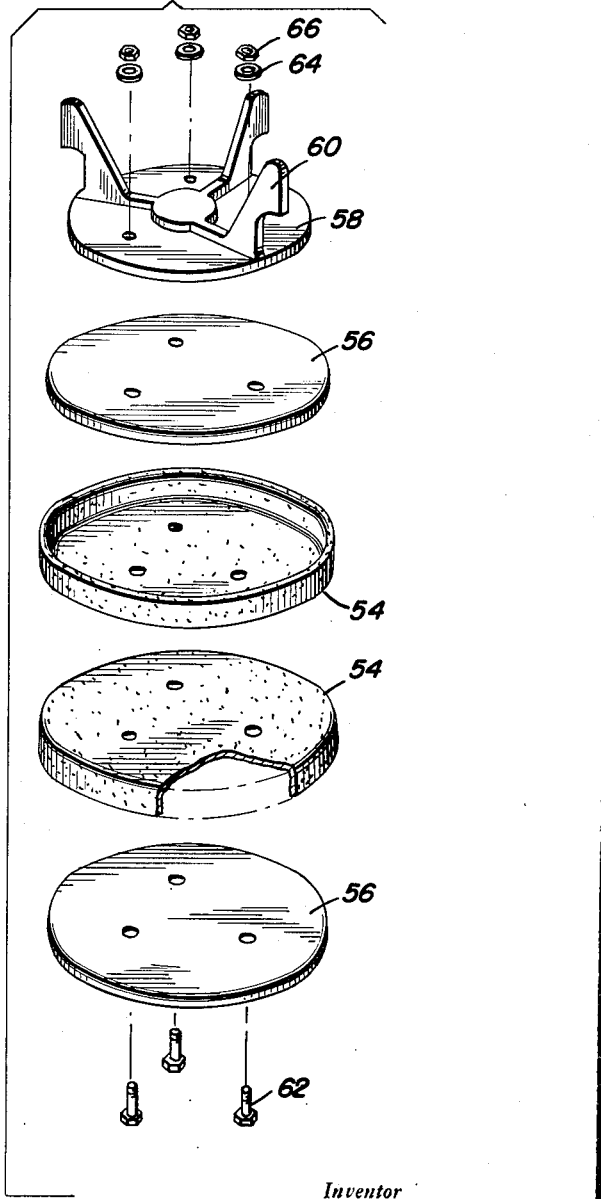
Inventor
Cortez F. Maddux
By Clarence A. O'Brien
and Harvey B. Jacobson
Attorneys Patented May 25, 1954

2,679,301

UNITED STATES PATENT OFFICE 2,679,301

MACHINE FOR LUBRICATING ANTI-FRICTION BEARINGS

Cortez F. Maddux, San Antonio, Tex.

Application August 17, 1949, Serial No. 110,821

1 Claim. (Cl. 184—1)

This invention comprises novel and useful improvements in lubricating machines, and more specifically relates to a machine for packing bearing assemblies of the type having inner and outer races with a plurality of anti-friction elements retained therebetween.

The primary object of this invention is to provide a lubricating machine for expeditiously and conveniently packing anti-friction bearings that requires a minimum of skill and attention of the operator.

Another important object of this invention is to provide a lubricating machine inherently capable of packing bearings of large down to very small size without necessitating adjustment or substitution of parts.

Another important object of the present invention is to provide a lubricating machine in which the bearing is automatically positioned for lubrication regardless of the size of the bearing and clamped in this position with the mounting opening sealed to prevent loss of lubricant.

Another important object of the present invention is to provide a lubricating machine in accordance with the foregoing objects in which the clamping of the bearing and the introduction of lubricant into the bearing is timed, and in which both the clamping of the bearing and its lubrication are accomplished through the agency of pressured fluid, there being a correlation between the clamping pressure and the lubricating pressure dependent on the size of the bearing.

A further object of the present invention is to provide a lubricating machine which shall introduce fresh lubricant into the bearing, and will do so in such a manner as to scour old lubricant and foreign particles from the bearing, and in which the fluid pressure actuated clamp and lubricant pressure may be selectively vented to release or cease lubrication of the bearing.

A still further object of the present invention is to provide a lubricating machine in accordance with the foregoing objects which shall be inexpensive, light enough in weight to be easily transported, and very efficient in its operation.

An important feature of the present invention resides in the provision of a structure permitting an orifice to be positioned in the exact center of the bearing seat whereby lubrication of extremely small bearings is possible, as their outer diameters need only slightly exceed the orifice diameter.

Another important feature of the present invention resides in the provision of a valve system for selectively operating the clamp and applying pressure to the lubricant, and for selectively venting the clamp and lubricating means.

These, together with various ancillary features and objects of the invention which will later become apparent as the following description proceeds, are attained by the present invention, a preferred embodiment of which has been illustrated by way of example only in the accompanying drawings, wherein:

Figure 1 is a front elevational view showing the lubricating machine mounted on a column, and with a bearing clamped in position for packing;

Figure 2 is a side elevational view of the machine as shown in Figure 1 with parts of the clamp broken away;

Figure 4 is a horizontal transverse sectional view taken substantially on the plane of the line 4—4 of Figure 1;

Figure 5 is a horizontal transverse sectional view taken substantially on the plane of the line 5—5 of Figure 1;

Figure 6 is a fragmentary vertical longitudinal sectional view taken substantially on the plane of the line 6—6 in Figure 1;

Figure 7 is a perspective view of the clamping ring; and,

Figure 8 is an exploded perspective view of the piston.

Figure 3:
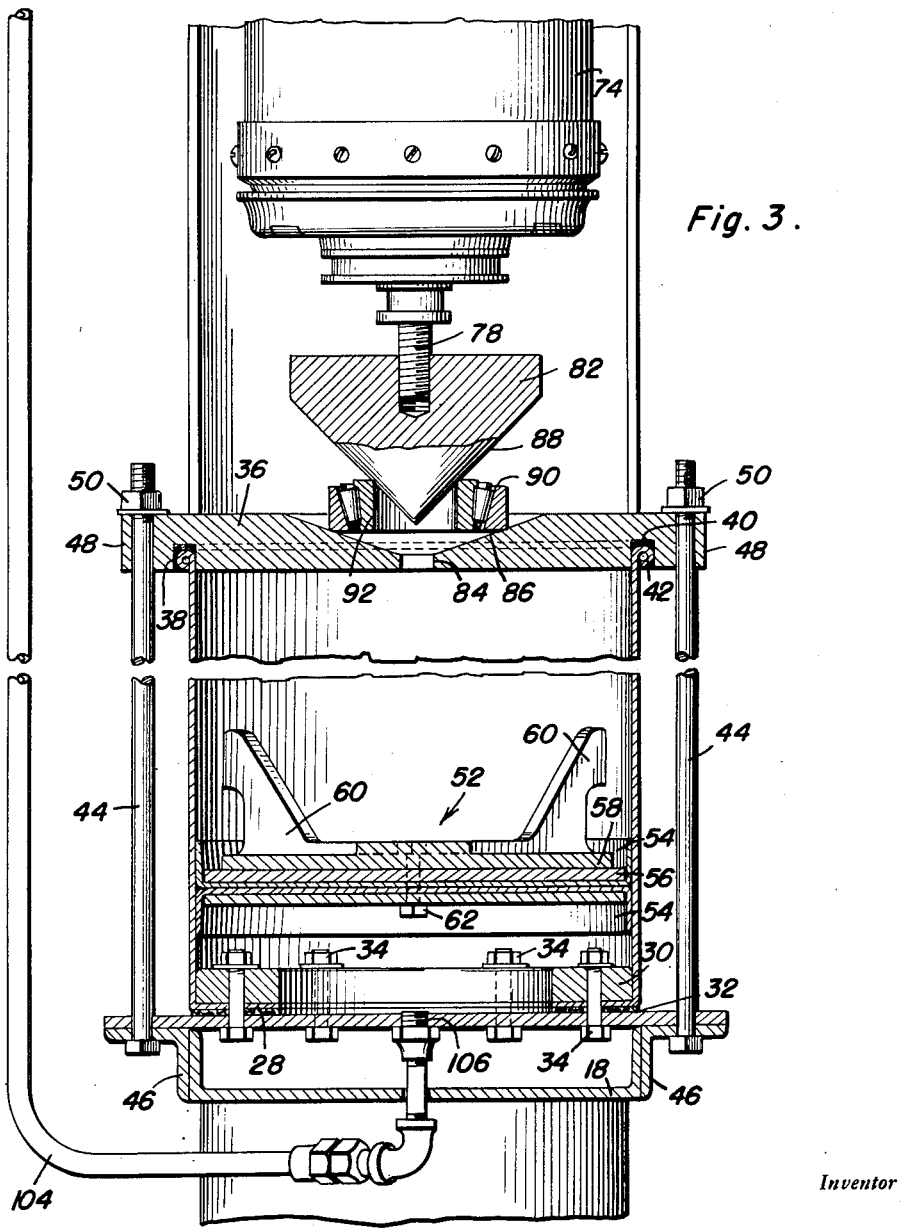
Figure 3 is a vertical longitudinal sectional view of the machine taken substantially on the plane of the broken line 3—3 of Figure 1 with parts being broken away.

Reference is now made more specifically to the accompanying drawings, wherein like numerals designate similar parts throughout the various views, and in which a suitable support member such as a pipe column is indicated by the numeral 10.

A channel member 12 is suitably secured to the column 10 as at 14, and has welded to its upper end a channel-shaped clamp support 16. Welded to the inner end of the member 12 is a channel-shaped base member 18 having legs 20 upon which rest the reservoir base 22.

The lubricant reservoir, indicated generally by the numeral 24, comprises a cylinder 26 that is hollow and has its lower end inturned to form a radially inwardly extending flange 28 upon which rests a clamping ring 30. The cylinder 26 rests on the reservoir base 22 with a gasket 32 interposed between the flange 28 and the reservoir base 22, and the cylinder 26 is clamped to the reservoir base 22 by means of the bolts 34 which extend through suitable apertures in the clamping ring 30, the flange 28, the gasket 32, and the reservoir base 22. The upper end of the cylinder 26 is provided with a lid 36, the lower side of which is provided with an annular groove 38 that receives an annular gasket 40 and a roller peripheral bead 42 formed at the upper end of the cylinder 26. The lid 36 is firmly held on the top of the cylinder 26 by means of the studs 44. Angles 46 are welded or otherwise suitably secured to the sides of the legs 20. As shown in Figure 3, the studs 44 extend through apertures in the reservoir base 22 and the angles 46, with the headed portions of the studs 44 resting against the angles 46, and are passed through loops formed against the sides of the lid 36 by attached straps 48. It will be seen that tightening the nuts 50 on the studs 44 will firmly hold the lid 36 on the top of the cylinder 26 and securely fasten the lubricant reservoir 24 on the base support 18.

Slidably mounted within the cylinder 26 is a piston indicated generally by the numeral 52 that comprises a pair of leather cups 54 disposed so that their bases abut, each containing a retaining plate 56. A disk 58 having upstanding legs 60 is disposed on the top of the piston 52, and the piston 52 is held in assembled relation by means of the bolts 62, washers 64 and nuts 66, the piston 52 being suitably apertured to receive the bolts 62. The upstanding legs 60 serve to guide and prevent binding of the piston 52 in its movement within the cylinder 26.

As will be seen in Figures 1 and 6, an eye bolt 68 is fastened through the web 70 of the clamp support 16. The eye bolt 68 extends between a pair of upstanding ears 72 on the top of the clamp housing 74, the latter being pivotally secured to the eye bolt 68, as by a pivot pin 75.

The clamp includes a piston 76, a piston rod 78, and a compression spring 80, and as shown in Figure 2 is of a type that a pressure differential in favor of the top side of the piston 76 will cause the piston rod 78 to move downward, and that upon equalization of the pressure above and below the piston 76 the piston rod 78 will move to its uppermost position.

The lower end of the piston rod 78 extends from the clamp housing 74 and has threaded thereon a wedge 82. There are sufficient threads on the piston rod 78 and in the wedge 82 for permitting considerable longitudinal adjustment of the wedge 82 relative to the piston 78, for a purpose set forth hereinafter.

The lid 36 is provided with a suitably positioned discharge orifice 84 and the upper surface of the lid 36 is concaved so as to form a bearing seat 86 that is in axial alignment with the discharge orifice 84. The lower surface of the wedge 82 is convexed, so that on downward movement of the piston rod 78, which is in axial alignment with the discharge orifice 84, the convex surface 88 will position a bearing 90 on the bearing seat 86.

It is to be noted that (as shown in Figure 3) after the convex surface 88 has positioned the bearing 90, continued downward pressure by the piston rod 78 will firmly hold the bearing 90 against the bearing seat 86 while at the same time the body of the wedge 82 effectively seals the mounting opening 92 of the bearing 90.

An oscillating distributor valve 94 is secured to the column 10 as at 96, and is connected by suitable piping 98 to a source of pressure fluid. The valve 94 is a three-way valve of a type sold on the open market and it is believed that a brief description of its function will sufficiently describe the same. The valve, when in the open position, permits communication between the inlet port and the outlet port, while sealing off the exhaust port. The valve, when in the closed position, cuts off the inlet port and permits communication between the outlet port and the exhaust pipe 99.

The outlet port is connected to a T-fitting 100 and is connected through the valve 102 to the tubing 104 which, in turn, communicates with the interior of the cylinder 26 through an aperture 106 in the reservoir base 22. The T-fitting 100, in addition, communicates through the flexible conduit 108 to the interior of the clamp housing 74 at a point above the piston 76.

The lubricating machine is readied for use by removing the lid 36 from the cylinder 26 and filling the upper portion of the cylinder with suitable lubricant and the lid 36 is then firmly secured in position on top of the cylinder 26. The inlet port of the valve 94 is connected to a source of pressure fluid, which is preferably compressed air, but may be water or any other fluid under pressure.

The operation of the device is very simple and it is believed will be readily understood. With the valve 94 in the closed position, the wedge 82 will be at some height above the bearing seat 86. The operator places the bearing to be lubricated on the concaved upper surface of the lid 36 and with the valve 102 in the closed position, opens valve 94, whereupon the wedge 82 descends and the convex surface 88 positions the bearing 90 on the bearing seat 86. The positioning of the bearing 90 may be facilitated by the operator gently moving the clamp housing 74 about its pivotal mounting. Leaving the valve 94 in the open position, the operator opens the valve 102, whereupon the piston 52 rises forcing lubricant through the discharge orifice 84 into the anti-friction elements contained within the bearing 90. The passage of the lubricant through the bearing 90 is so even and forceful that it carries before it the old lubricant and any foreign particles that might be within the bearing 90. After sufficient lubricant has passed through the bearing 90, the operator closes the valve 94 which vents the outlet port pressure, whereupon lubricant ceases to be forced through the discharge orifice 84 and the wedge 82 rises to its retracted position.

For the sake of simplicity in the drawings, the convex surface 88 and the bearing seat 86 have been shown as being conical in shape. However, it is obvious that the surfaces need not be so limited in nature. For instance, surfaces that are spherical segments may be highly desirable in that the bearing need not be positioned horizontally in order to seat properly.

It is to be noted that the taper of the surface 88 is much sharper than that of the bearing seat 86. This is for the purpose of requiring a greater downward movement of the piston rod 78 when small bearings are being lubricated, as this will reduce the clamping pressure exerted by the piston rod 78. This is because downward movement of the piston rod 78 causes compression of the spring 80, thereby progressively reducing the clamping pressure. The strength of the spring 80 is so chosen and the wedge 82 so adjusted on the piston rod 78 that damage to very small bearings may be avoided. A further advantage resides in the sharp taper of the surface 88, as this permits the operator to easily observe the progress of the bearing packing operation.

From the foregoing, the construction and operation of the device will be easily understood and further explanation is believed to be unnecessary. However, since numerous modifications and changes will readily occur to those skilled in the art after a consideration of the foregoing specification and accompanying drawings, it is not desired to limit the invention to the exact construction shown and described, and all suitable modifications and equivalents may be resorted to, falling within the scope of appended claim.

Having described the invention, what is claimed as new is:

A machine for lubricating a bearing assembly of the type having inner and outer races with antifriction elements therebetween and having a mounting opening in the inner race, comprising an upright frame member, a laterally projecting base member attached to said frame member, a lubricant reservoir mounted on said base, said reservoir having a discharge orifice, a concave bearing seat surrounding said orifice, a clamp support secured to said frame member, a cylinder pivotally mounted on said support, a piston slidably received in said cylinder, a piston rod projecting from said cylinder, a cylinder head on said cylinder, said rod extending through said head, a spring interposed between said head and said piston, said piston rod being in alignment with said orifice, the end of the piston rod adjacent to the orifice being convex and adapted to engage and seat the mounting opening in the inner race of a bearing, a source of fluid under pressure, a piston in said reservoir, conduits for connecting said fluid to said cylinder and to said reservoir, and valve means for sequentially applying said fluid to said cylinder and to said reservoir.

References Cited in the file of this patent

UNITED STATES PATENTS

| Number | Name | Date |
|---|---|---|
| 1,173,656 | Flanigan | Feb. 29, 1916 |
| 1,430,226 | Goodreau | Sept. 26, 1922 |
| 1,465,620 | Anderson | Aug. 21, 1923 |
| 1,991,542 | Cavanaugh | Feb. 19, 1935 |
| 2,168,746 | Saal | Aug. 8, 1939 |
| 2,209,495 | Scholfield | July 30, 1940 |
| 2,489,809 | Owens | Nov. 29, 1949 |

FOREIGN PATENTS

| Number | Country | Date |
|---|---|---|
| 906,794 | France | May 28, 1945 |